W. J. MILLER.
Coffee Pot.
No. 111,861. Patented Feb. 14, 1871.
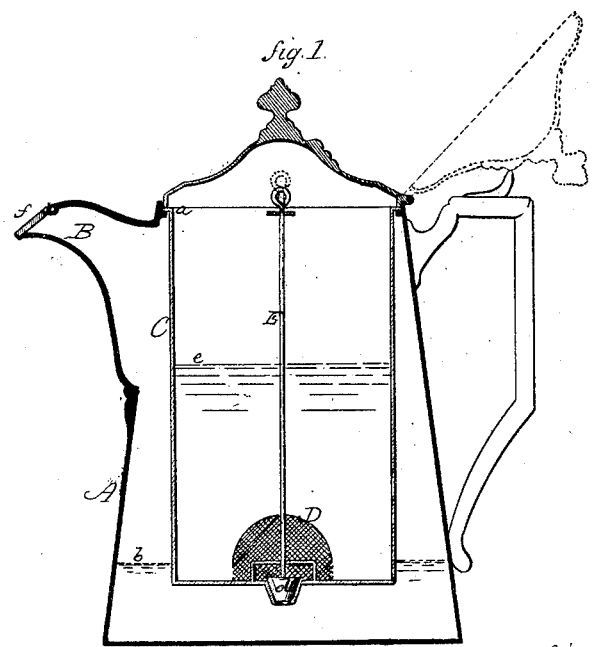
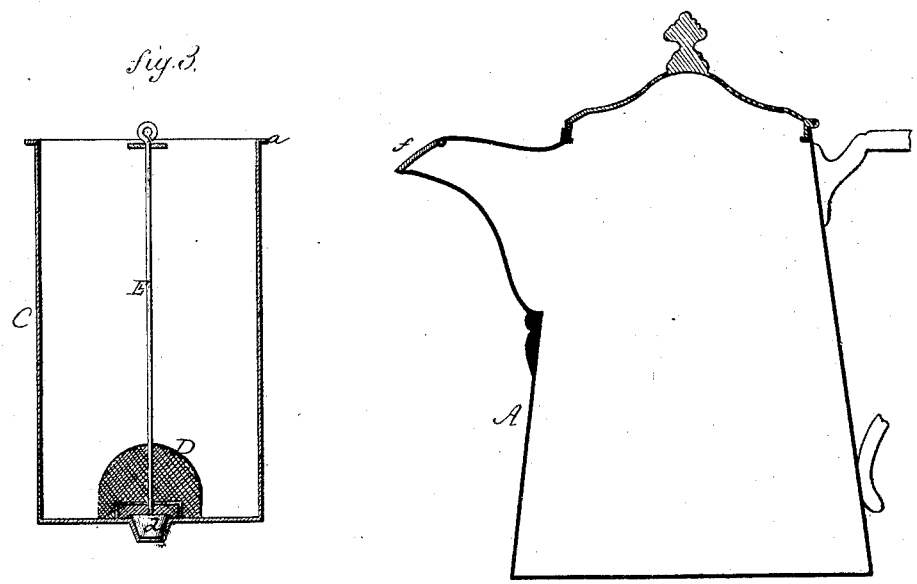

United States Patent Office.

WATSON J. MILLER, OF MIDDLETOWN, CONNECTICUT, ASSIGNOR TO SIMONS & MILLER, OF SAME PLACE.

Letters Patent No. 111,861, dated February 14, 1871.

IMPROVEMENT IN COFFEE-POTS.

The Schedule referred to in these Letters Patent and making part of the same.

*To all whom it may concern:*

Be it known that I, WATSON J. MILLER, of Middletown, in the county of Middlesex and State of Connecticut, have invented a new Improvement in Coffee-Pots; and I do hereby declare the following, when taken in connection with the accompanying drawing and the letters of reference marked thereon, to be a full, clear, and exact description of the same, and which said drawing constitutes part of this specification, and represents in—

Figure 1 a vertical central section of the pot as in use;

Figure 2, a vertical central section of the pot with the cylinder removed; and in Figure 3, a vertical central section of the cylinder removed.

This invention relates to an improvement in pots designed for making tea or coffee, and for like purposes, and which herein I term coffee-pots, by that title being understood to embrace all purposes to which such vessels are usually adapted.

My invention consists in the arrangement of a cylinder within the body of the pot so as to be removed therefrom, and to form a chamber between the outer surface of the said cylinder and the pot proper, as also beneath the cylinder, into which space the water is placed to boil, and the cylinder arranged to receive the tea or coffee, and water for cooking the same, the steeping or cooking within the cylinder being caused by boiling the water in the chamber around the cylinder, and the said cylinder provided with a valve in or near the bottom, so that, when the cooking or steeping is performed, the contents of the cylinder may be drawn into the pot proper, to mingle with the boiling water, thence to be poured from the spout of the pot in the usual manner.

A is the pot, externally of common construction, provided with a spout, B, through which the contents of the pot are poured off.

C is the cylinder, shown detached in fig. 3, formed to set into the pot, and supported at the top by a flange, *a*, or otherwise, and of a depth and size to leave a space beneath and around the said cylinder, as seen in fig. 1.

In or near the bottom of the cylinder C I arrange a valve, *d*, which closes tight the opening into which it is fitted, and over this valve I arrange a network, D, the purpose of which is more fully hereafter described.

To operate the valve I extend a rod, E, up to or near the top of the cylinder, as seen in fig. 3, so that, by drawing up on the said rod, the valve will be raised as denoted in broken lines, fig. 1.

This completes the construction of the pot. The operation is as follows:

Pour water into the pot, from which the cylinder has been removed, until the requisite quantity for boiling is introduced, here denoted by the line *b*; then set the cylinder into the pot, and into the cylinder place the tea or coffee, or whatever may be desired to steep, and onto this pour the requisite quantity of water, here denoted by the line *e*; then set the pot into position for boiling, and the water around the cylinder boils freely until the material within the cylinder is thoroughly cooked or steeped.

The valve *f*, which closes the spout, serves as a safety-valve, through which the steam, beyond a certain pressure, may escape.

The water within the cylinder will not boil, but will be heated and retain heat sufficient to steep the material mingled with it, and from the cylinder none of the aroma can escape, the cover closing the top.

It should be observed that, in filling both the pot and cylinder, the total amount of water in both should be only so much as is finally to be required for the desired strength of the decoction.

After the steeping or cooking is effected open the cover, as in fig. 1, take hold of and raise the rod E, thereby opening the valve in the bottom, and gradually raise the cylinder from the pot, allowing the impregnated water in the cylinder to pass through the valve-opening and mingle with the water in the pot, the network B preventing the escape of anything except in a fluid state. Take this cylinder entirely from the pot and the tea or coffee is ready for use, to be poured off in the usual manner.

I claim as my invention—

1. In combination with the pot A, the closed removable cylinder C, arranged within the pot to form a space around and beneath the cylinder, substantially as set forth.

2. In combination with the pot A, the removable cylinder C arranged within the pot as described, and provided with the valve *d*, as and for the purpose described.

WATSON J. MILLER.

Witnesses:
HENRY J. NEARING,
EDWARD M. TUTTLE.